US012677223B2

(12) United States Patent
Liu

(10) Patent No.: US 12,677,223 B2
(45) Date of Patent: Jul. 7, 2026

(54) OPEN-LOOP POWER CONTROL METHOD AND APPARATUS FOR PUSCH, AND STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 309 days.

(21) Appl. No.: 18/284,240

(22) PCT Filed: Mar. 31, 2021

(86) PCT No.: PCT/CN2021/084744
§ 371 (c)(1),
(2) Date: Sep. 26, 2023

(87) PCT Pub. No.: WO2022/205222
PCT Pub. Date: Oct. 6, 2022

(65) Prior Publication Data
US 2024/0163804 A1 May 16, 2024

(51) Int. Cl.
*H04W 52/10* (2009.01)
*H04L 5/00* (2006.01)
*H04W 72/232* (2023.01)

(52) U.S. Cl.
CPC .......... *H04W 52/10* (2013.01); *H04L 5/0035* (2013.01); *H04L 5/0048* (2013.01); *H04W 72/232* (2023.01)

(58) Field of Classification Search
CPC ...... H04W 52/10; H04W 72/232; H04L 5/00; H04L 5/0035; H04L 5/0048
See application file for complete search history.

(56) References Cited

U.S. PATENT DOCUMENTS 10,986,583 B2 * 4/2021 MolavianJazi ..... H04W 52/146
11,191,033 B2 * 11/2021 Sridharan ........... H04B 7/0639
(Continued)

FOREIGN PATENT DOCUMENTS

CN      112534887 A      3/2021
EP      3793268 A1      3/2021
(Continued)

OTHER PUBLICATIONS

European Patent Application No. 21933883.7 Search Report dated Apr. 18, 2024, 10 pages.
(Continued)

*Primary Examiner* — Hai V Nguyen
(74) *Attorney, Agent, or Firm* — Cozen O'Connor

(57) ABSTRACT
An open-loop power control method and apparatus for a PUSCH. The method includes: configuring and determining an open-loop power control (OLPC) parameter required by a terminal, in which the OLPC parameter includes one or more power boosting parameters corresponding to one or more transmission and reception points (TRPs); and sending first indication information, in which the first indication information is configured to indicate power boosting parameters used when the PUSCH is sent based on a multi-TRP cooperation, and the power boosting parameters used when the PUSCH is sent correspond to different cooperative TRPs to which the PUSCH is sent.

16 Claims, 5 Drawing Sheets

TRP1                    TRP2

Terminal 1 (URLLC and eMBB)          Terminal 2 (eMBB)

(56) References Cited

U.S. PATENT DOCUMENTS

| | | | | |
|---|---|---|---|---|
| 11,523,349 B1 * | 12/2022 | Huang | ................. | H04W 52/58 |
| 11,553,437 B2 * | 1/2023 | Iwai | ...................... | H04W 52/56 |
| 11,564,173 B2 * | 1/2023 | Yang | ................. | H04W 52/386 |
| 11,601,890 B2 * | 3/2023 | Saha | ..................... | H04L 5/0051 |
| 11,671,925 B2 * | 6/2023 | Chen | ........................ | H04L 1/08 |
| | | | | 370/328 |
| 11,729,723 B2 * | 8/2023 | Yang | ................... | H04W 52/36 |
| | | | | 370/329 |
| 11,778,569 B2 * | 10/2023 | Sridharan | .......... | H04W 52/146 |
| | | | | 455/522 |
| 11,864,124 B2 * | 1/2024 | Huang | ............... | H04W 52/146 |
| 11,895,601 B2 * | 2/2024 | Yao | ..................... | H04W 52/146 |
| 12,192,912 B2 * | 1/2025 | Lim | ..................... | H04W 52/10 |
| 12,192,916 B2 * | 1/2025 | Huang | ................. | H04W 52/34 |
| 12,225,522 B2 * | 2/2025 | Yi | ........................ | H04L 5/0023 |
| 2020/0045644 A1 * | 2/2020 | Sridharan | .......... | H04B 7/0639 |
| 2020/0236634 A1 * | 7/2020 | Sridharan | .......... | H04W 52/367 |
| 2020/0280928 A1 * | 9/2020 | MolavianJazi | ..... | H04W 52/146 |
| 2021/0160784 A1 * | 5/2021 | Yang | ..................... | H04W 52/10 |
| 2021/0250870 A1 * | 8/2021 | Iwai | ................... | H04W 52/146 |
| 2021/0258894 A1 * | 8/2021 | Yao | ..................... | H04W 52/146 |
| 2021/0377870 A1 * | 12/2021 | Yang | ..................... | H04W 52/10 |
| 2022/0225362 A1 * | 7/2022 | Yi | .......................... | H04L 1/189 |
| 2022/0312337 A1 * | 9/2022 | Lim | ................... | H04W 52/242 |
| 2022/0369243 A1 * | 11/2022 | Chen | ........................ | H04L 1/08 |
| 2022/0394624 A1 * | 12/2022 | Huang | ................. | H04W 52/58 |
| 2023/0053727 A1 * | 2/2023 | Huang | ................. | H04W 72/23 |
| 2023/0128306 A1 * | 4/2023 | Khoshnevisan | ...... | H04L 5/0094 |
| | | | | 455/522 |
| 2023/0269057 A1 * | 8/2023 | Sengupta | .............. | H04L 5/0092 |
| | | | | 370/329 |
| 2023/0354205 A1 * | 11/2023 | Khoshnevisan | ...... | H04W 52/10 |
| 2024/0172225 A1 * | 5/2024 | Liu | ................... | H04W 72/1268 |
| 2024/0251361 A1 * | 7/2024 | Yao | ..................... | H04W 52/146 |
| 2024/0314704 A1 * | 9/2024 | Li | ........................ | H04W 52/146 |
| 2024/0349198 A1 * | 10/2024 | Gao | ..................... | H04B 7/024 |
| 2024/0406889 A1 * | 12/2024 | Yuan | ..................... | H04W 52/48 |
| 2024/0422690 A1 * | 12/2024 | Guo | ................... | H04W 52/146 |
| 2025/0184907 A1 * | 6/2025 | Lim | ................... | H04W 52/146 |

FOREIGN PATENT DOCUMENTS

| | | | | | |
|---|---|---|---|---|---|
| EP | | 4383840 A1 * | 6/2024 | ......... | H04W 52/146 |
| WO | WO-2022203467 A1 * | | 9/2022 | ......... | H04W 52/365 |

OTHER PUBLICATIONS

Qualcomm Incorporated, "Enhancements on Multi-TRP for PDCCH, PUCCH and PUSCH" 3GPP TSG-RAN WGI Meeting #104-e, RI-2101447, 2021, 28 pages.

PCT/CN2021/084744, International Search Report dated Nov. 29, 2021, 2 pages.

* cited by examiner

TRP1             TRP2

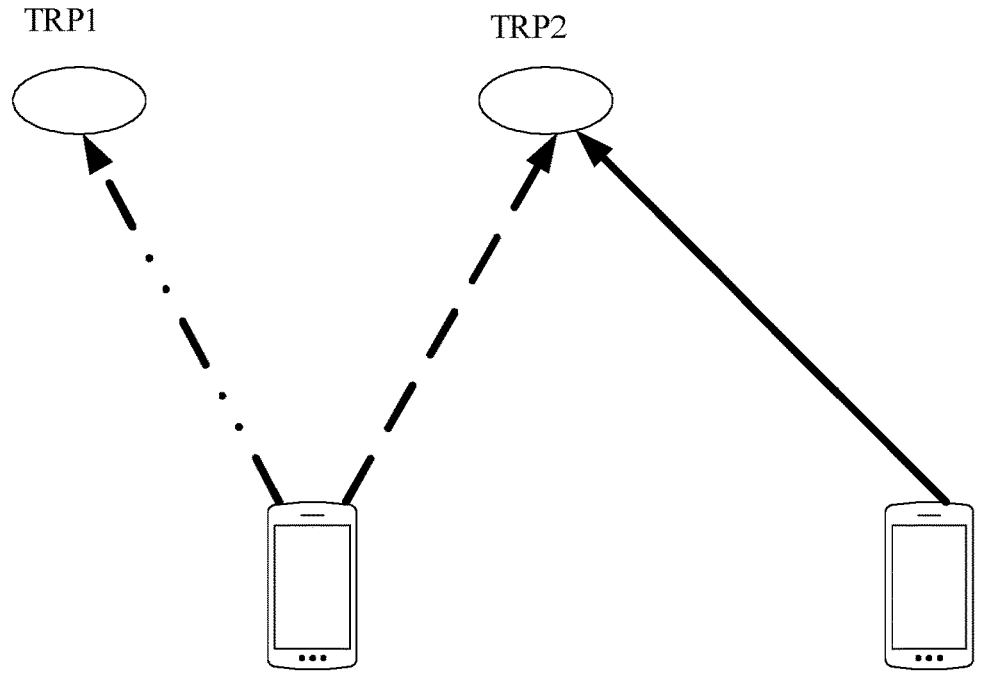

Terminal 1 (URLLC and eMBB)           Terminal 2 (eMBB)

FIG. 1

| configuring and determining an open-loop power control (OLPC) parameter required by a terminal, in which, the OLPC parameter includes one or more power boosting parameters corresponding to one or more transmission and reception point (TRPs) | S11 |

| sending first indication information, in which, the first indication information is configured to indicate power boosting parameters used when the PUSCH is sent based on a multi-TRP cooperation, and the power boosting parameters used when the PUSCH is sent correspond to different cooperative TRPs to which the PUSCH is sent | S12 |

FIG. 2

| determining the OLPC parameter based on RRC configuration information, in which, the RRC configuration information is used to configure power boosting parameters respectively for the PUSCH sent to different TRPs | S21 |

FIG. 3 sending the first indication information based on DCI     S31

FIG. 4 sending the first indication information based on TPC     S41

FIG. 5 sending second indication information, the second indication information being configured to indicate whether accumulation calculation is applied to the power adjustment values indicated by the TPC     S51

FIG. 6 receiving first indication information in response to the terminal being configured with an OLPC parameter and the OLPC parameter including one or more power boosting parameters corresponding to one or more TRPs     S61 determining, based on the first indication information, power boosting parameter used when the PUSCH is sent based on a multi-TRP cooperation     S62

FIG. 7 receiving the first indication information through DCI     S71

FIG. 8 receiving the first indication information based on TPC — S81
FIG. 9
receiving second indication information, the second indication information being configured to indicate whether accumulation calculation is applied to the power adjustment values indicated by the TPC — S91
FIG. 10
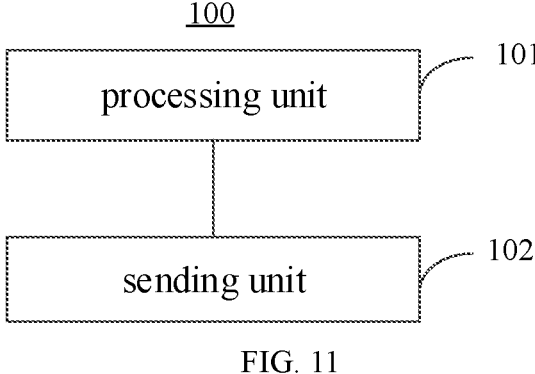
100
processing unit — 101
sending unit — 102
FIG. 11
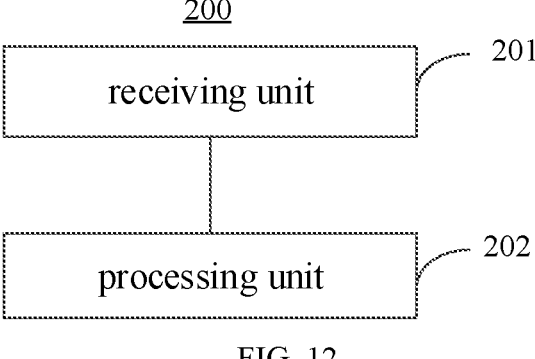
200
receiving unit — 201
processing unit — 202
FIG. 12

400

OPEN-LOOP POWER CONTROL METHOD AND APPARATUS FOR PUSCH, AND STORAGE MEDIUM

CROSS-REFERENCE TO RELATED APPLICATION

This application is a U.S. national phase application of International Application No. PCT/CN2021/084744, filed on Mar. 31, 2021, the content of which is hereby incorporated by reference in its entirety.

TECHNICAL FIELD

The disclosure relates to a field of communication technologies, and more particularly, to a method and an apparatus for controlling an open-loop power of a physical uplink shared channel (PUSCH), and a storage medium.

BACKGROUND

In the R17, for a PUSCH enhancement based on Multi-TRP/PANEL, in a PUSCH transmission scenario, a situation that the URLLC traffic sent based on the Multi-TRP conflicts with an eMBB traffic on different TRPs may be occurred, that is, conflict and interference situations of receptions of two TRPs on the network device side are different. How to enhance a power boosting mechanism of the open-loop power control (OLPC) for multiple TRPs is a topic that needs to be studied.

SUMMARY

According to a first aspect of embodiments of the disclosure, there is provided a method for controlling an open-loop power of a PUSCH, performed by a network device. The method includes:

configuring and determining an open-loop power control (OLPC) parameter required by a terminal, in which, the OLPC parameter includes one or more power boosting parameters corresponding to one or more transmission and reception points (TRPs); and sending first indication information, in which, the first indication information is configured to indicate power boosting parameters used when the PUSCH is sent based on a multi-TRP cooperation, and the power boosting parameters used when the PUSCH is sent correspond to different cooperative TRPs to which the PUSCH is sent.

According to a second aspect of embodiments of the disclosure, there is provided a method for controlling an open-loop power of a PUSCH, performed by a terminal. The method includes:

receiving first indication information, in which the terminal is configured with an OLPC parameter and the OLPC parameter includes one or more power boosting parameters corresponding to one or more TRPs, in which, the first indication information is configured to indicate power boosting parameters used when the PUSCH is sent based on a multi-TRP cooperation, and the power boosting parameters used when the PUSCH is sent correspond to different cooperative TRPs to which the PUSCH is sent; and determining, based on the first indication information, the power boosting parameters used when the PUSCH is sent based on the multi-TRP cooperation.

According to a third aspect of embodiments of the disclosure, there is provided an apparatus for controlling an open-loop power of a PUSCH, including:

a processor; and a memory for storing instructions executable by the processor.

The processor is configured to: execute the method for controlling an open-loop power of a PUSCH according to the first aspect or any implementation of the first aspect.

According to a fourth aspect of embodiments of the disclosure, there is provided an apparatus for controlling an open-loop power of a PUSCH, including:

a processor; and a memory for storing instructions executable by the processor.

The processor is configured to: execute the method for controlling an open-loop power of a PUSCH according to the second aspect or any implementation of the second aspect.

It should be understood that both the foregoing general description and the following detailed description are exemplary and explanatory only, and are not restrictive of the disclosure.

BRIEF DESCRIPTION OF THE DRAWINGS

The accompanying drawings herein, which are incorporated in and constitute a part of this specification, illustrate embodiments consistent with the disclosure, and serve to explain the principle of the disclosure together with the specification.

FIG. 1 is a schematic diagram illustrating a wireless communication system according to an exemplary embodiment.

FIG. 2 is a flow chart illustrating a method for controlling an open-loop power of a physical uplink shared channel (PUSCH) according to an exemplary embodiment.

FIG. 3 is a flow chart illustrating a method for controlling an open-loop power of a PUSCH according to an exemplary embodiment.

FIG. 4 is a flow chart illustrating a method for controlling an open-loop power of a PUSCH according to an exemplary embodiment.

FIG. 5 is a flow chart illustrating a method for controlling an open-loop power of a PUSCH according to an exemplary embodiment.

FIG. 6 is a flow chart illustrating a method for controlling an open-loop power of a PUSCH according to an exemplary embodiment.

FIG. 7 is a flow chart illustrating a method for controlling an open-loop power of a PUSCH according to an exemplary embodiment.

FIG. 8 is a flow chart illustrating a method for controlling an open-loop power of a PUSCH according to an exemplary embodiment.

FIG. 9 is a flow chart illustrating a method for controlling an open-loop power of a PUSCH according to an exemplary embodiment.

FIG. 10 is a flow chart illustrating a method for controlling an open-loop power of a PUSCH according to an exemplary embodiment.

FIG. 11 is a block diagram illustrating an apparatus for controlling an open-loop power of a PUSCH according to an exemplary embodiment.

FIG. 12 is a block diagram illustrating an apparatus for controlling an open-loop power of a PUSCH according to an exemplary embodiment.

DETAILED DESCRIPTION

Figure 13:
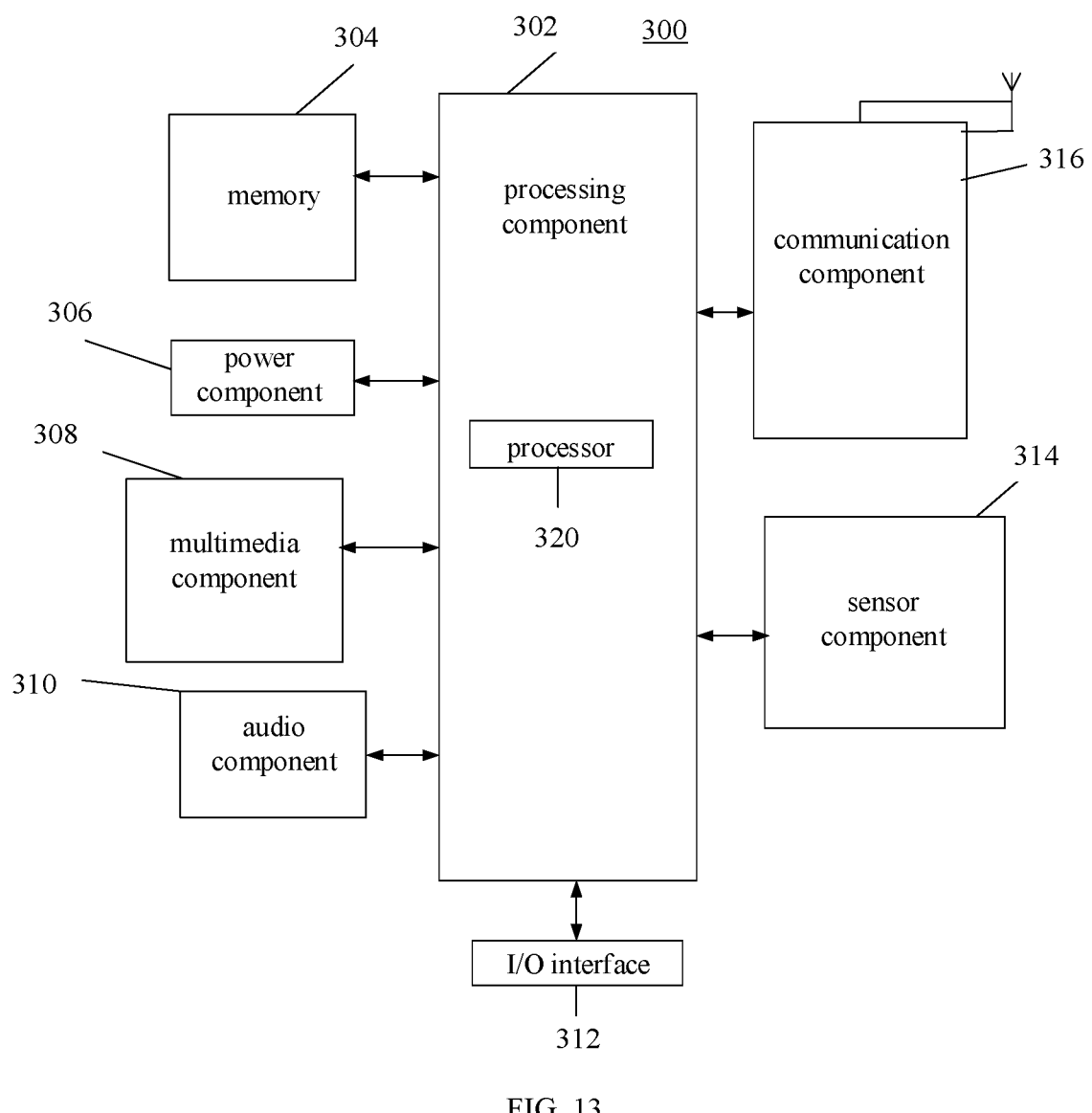
FIG. 13 is a block diagram illustrating an apparatus for controlling an open-loop power of a PUSCH according to an exemplary embodiment.

Reference will now be made in detail to exemplary embodiments, examples of which are illustrated in the accompanying drawings. The following description refers to the accompanying drawings in which the same numbers in different accompanying drawings represent the same or similar elements unless otherwise represented. The implementations set forth in the following description of exemplary embodiments do not represent all implementations consistent with the disclosure. Instead, they are merely examples of apparatuses and methods consistent with some aspects related to the disclosure as recited in the appended claims.

A method for controlling an open-loop power of a physical uplink shared channel (PUSCH) according to embodiments of the disclosure may be applied to a wireless communication system illustrated in FIG. 1. Referring to FIG. 1, the wireless communication system includes a network device and a terminal. The terminal is connected to the network device via a wireless resource and performs data transmission. The data transmission is performed between the network device and the terminal based on beams. Enhancement may be performed on PUSCH uplink transmission based on Multi-TRP between the network device and the terminal.

It may be understood that, there may be one or more transmission and reception points (TRPs) for the network device to transmit data to the terminal based on the Multi-TRP. The network device performs the data transmission with a terminal 1 and a terminal 2 based on a TRP1 and a TRP2 in the wireless communication system illustrated in FIG. 1, which is only a schematic illustration, and is not limited.

It may be further understood that, the wireless communication system illustrated in FIG. 1 is merely a schematic illustration. The wireless communication system may also include other network devices, such as core network devices, wireless relay devices, wireless backhaul devices, and the like, which are not illustrated in FIG. 1. The number of network devices and the number of terminals included in the wireless communication system are not limited in embodiments of the disclosure.

It may be further understood that the wireless communication system in embodiments of the disclosure is a network that provides a wireless communication function. The wireless communication system may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier frequency division multiple access (SC-FDMA), and carrier sense multiple access with collision avoidance. The networks may be classified into a 2nd generation (2G) network, a 3G network, a 4G network, or a future evolution network, such as a 5G network, which may also be referred to as a new radio (NR) network, based on the capacity, rate, delay and other factors of different networks. For ease of description, a wireless communication network will be sometimes abbreviated as a network in the disclosure.

Further, the network device involved in the disclosure may also be referred to as a radio access network device. The radio access network device may be a base station, an evolved node B, a home base station, an access point (AP), a wireless relay node, a wireless backhaul node, a transmission point (TP), a transmission and reception point (TRP) in a wireless fidelity (WIFI) system, or the like, or may also be a gNB in a NR system, or may also be a component or a part of a device that constitutes a base station, etc. It is to be understood that the specific technology and specific device form employed by the network device are not limited in embodiments of the disclosure. In the disclosure, the network device may provide communication coverage for a specific geographical area, and may communicate with a terminal located in the coverage area (cell). In addition, the network device may also be a vehicle-mounted device when it is used in a vehicle to everything (V2X) communication system.

Further, the terminal involved in the disclosure, which may also be referred to as a terminal device, a user equipment (UE), a mobile station (MS), a mobile terminal (MT), etc., is a device that provides voice and/or data connectivity to a user. For example, the terminal may be a handheld device with a wireless connection function, a vehicle-mounted device, or the like. Presently, some examples of the terminal include a smart phone, a customer premise equipment (CPE) a pocket personal computer (PPC), a palmtop computer, a personal digital assistant (PDA), a notebook computer, a tablet, a wearable device, a vehicle-mounted device, or the like. In addition, the terminal device may also be the vehicle-mounted device when it is used in the vehicle to everything (V2X) communication system. It is to be understood that the specific technology and specific device form employed by the terminal are not limited in the embodiments of the disclosure.

With development of communication technologies, in order to ensure coverage, beam-based transmission and reception need to be employed. When a network device (such as a base station) has multiple transmission and reception points (TRPs), multiple TRPs/multiple panels (Multi-TRP/PANEL) may be employed to provide services to a terminal. An application of the Multi-TRP/PANEL in the network device is mainly to improve the coverage at a cell edge, to provide a more balanced service quality in a service area, and to cooperatively transmit data among the Multi-TRP/PANEL by employing different ways. From perspective of a network morphology, network deployment with a large number of distributed access points and baseband centralized processing may be more conducive to providing a balanced user-perceived rate, and significantly reducing delay and signaling overhead caused by handover. Performing channel transmission/reception based on multiple beams of multiple angles by utilizing the cooperation among the Multi-TRP/PANEL may better overcome various occlusion/blocking effects and ensure robustness of a link connection, and it is suitable for ultra-reliable low latency communication (URLLC) traffics to improve a transmission quality and to meet a reliability requirement.

In a research stage of R16, a transmission enhancement is performed on a physical downlink shared channel (PDSCH) based on an application of a downlink multi-point cooperative transmission technology among Multi-TRP/PANEL. Since data transmission includes scheduling feedback of uplink and downlink channels, service performance may not be guaranteed when only enhancing a downlink data channel in the research of URLLC. Therefore, in the research of R17, enhancement is proceeded on a physical downlink control channel (PDCCH), a physical uplink control channel (PUCCH) and a physical uplink shared channel (PUSCH).

In a communication system, there are data traffics with different priorities, delay requirements or reliability requirements, such as an URLLC traffic with an extremely high requirement for delay and reliability, and an enhanced mobile broadband (eMBB) traffic with a relatively low requirement for delay and reliability. Under a normal circumstance, the URLLC may be scheduled with a shorter transmission time interval, and the URLLC traffic is bursty and random, presenting a sporadic characteristic in a resource distribution and having a lower resource utilization. Therefore, it is considered that the URLLC traffic is multiplexed with an eMBB transmission, to improve the resource utilization. Different from a downlink transmission, a certain terminal may not determine whether a transmission resource of traffic data overlap with that used by another terminal to transmit a traffic of a different priority when sending uplink data.

In the disclosure, open-loop power control may be performed between the network device and the terminal. In order to ensure the reliability of the transmission of the URLLC traffic, R16 introduces an open-loop power control parameter set indication in scheduling downlink control information (DCI) to indicate a power boosting indication function for scheduling the PUSCH, and introduces a new radio resource control (RRC) parameter P0-PUSCH-Set to indicate the power control. Each sounding reference signal (SRS) resource indication (SRI) corresponds to a P0-PUSCH-Set parameter of the open-loop power control and is indicated by the open-loop power control parameter set indication field.

In the R17, for a PUSCH enhancement based on Multi-TRP/PANEL, in a PUSCH transmission scenario, a situation that the URLLC traffic sent based on the Multi-TRP conflicts with an eMBB traffic on different TRPs may be occurred, that is, conflict and interference situations of receptions of two TRPs on the network device side are different. How to enhance a power boosting mechanism of the open-loop power control (OLPC) for multiple TRPs is a topic that needs to be studied.

The network device notifies the terminal by a higher-layer signaling p0-PUSCH-SetList-r16 whether there is a power control parameter set indication field. When the higher-layer parameter p0-PUSCH-SetList-r16 is not configured, the open-loop power control parameter set indication field is 0 bit, that is, the open-loop power control parameter set indication field does not exist. The terminal obtains P0 from a P0-PUSCH-AlphaSet based on an original mechanism of the Rel-15. The open-loop power control parameter set indication field may be configured as 1 bit or 2 bits by the higher-layer signaling when the higher-layer parameter P0-PUSCH-SetList-r16 is configured.

1) The open-loop power control parameter set indication field is configured as 1 bit when an SRI field exists in the DCI.

2) The open-loop power control parameter set indication field may be configured as 1 bit or 2 bits based on the higher-layer signaling when no SRI field exists in the DCI.

3) For the above scenario where the SRI field exists in the DCI, the mechanism of the Rel-15 is still employed to obtain P0 from the P0-PUSCH-AlphaSet based on an SRI in case that the open-loop power control parameter set indication field has a value of "0". The terminal obtains P0 from the open-loop parameter set P0-PUSCH-Set for the power boosting based on the SRI in case that the open-loop power control parameter set indication field has a value of "1".

For the scenario where no SRI field exists in the DCI, the RAN1 #99 meeting approved that the open-loop power control indication field in the DCI may be configured as 1 bit or 2 bits, and the parameter P0-PUSCH-Set may be configured with up to two P0 values.

In embodiments of the disclosure, the method for controlling an open-loop power of a PUSCH is applied in a scenario where a traffic confliction occurs and a power control parameter is adjusted during communication performed by the terminal. For example, in FIG. 1, a terminal 1 performs a URLLC traffic and an eMBB traffic, and a terminal 2 performs an eMBB traffic. A starting point of embodiments of the disclosure is that when the terminal 1 configured with both the eMBB traffic and the URLLC traffic conflicts with the terminal 2 configured with the eMBB traffic, the terminal 1 requires three different open-loop power levels for the power boosting of eMBB and URLLC, which may be: 1) baseline P0 for the eMBB, obtained from the P0-PUSCH-AlphaSet; 2) higher P0, used for the power boosting of the URLLC traffic that does not conflict with the eMBB; and 3) highest P0, used for the PUSCH of the URLLC conflicting with the eMBB.

In order to more clearly describe how the terminal determines P0 based on the higher-layer parameter and a DCI indication, please refer to Table 1. Table 1 illustrates how the terminal determines P0 based on the higher-layer parameter and the DCI indication.

TABLE 1

| higher-layer parameter | SRI field | open-loop power control parameter set indication filed | obtaining P0 by the UE |
|---|---|---|---|
| not configuring P0-PUSCH-Set-List | — | 0 bit | obtaining P0 from the Rel-15 parameter P0-PUSCH-AlphaSeto |
| configuring P0-PUSCH-Set-List | exist | merely configuring 1 bit, indicating as "0" | obtaining P0 from the Rel-15 parameter P0-PUSCH-AlphaSet |
| | | merely configuring 1 bit, indicating as "1" | obtaining P0 from P0-PUSCH-Set |
| | not exist | configuring 1 bit, indicating as "0"; or configuring 2 bits, indicating as "00" | obtaining P0 from the Rel-15 parameter P0-PUSCH-AlphaSet |

TABLE 1-continued

| higher-layer parameter | SRI field | open-loop power control parameter set indication filed | obtaining PO by the UE |
|---|---|---|---|
| | | configuring 1 bit, indicating as "1"; or configuring 2 bits, indicating as "01" | using a first value of P0-PUSCH-Set as P0 |
| | | configuring 2 bits, indicating as "10" | using a second value of P0-PUSCH-Set as P0 |

In the related art, data transmission is performed between the network device and the terminal based on beams. In R17, the enhancement may be performed on the PUSCH uplink transmission based on the Multi-TRP between the network device and the terminal. For an enhancement solution of the PUSCH based on the Multi-TRP, a situation that the URLLC traffic sent based on the multi-TRP conflicts with the eMBB traffic in different TRPs may also be occurred in a PUSCH transmission scenario. That is, there are different confliction and interference situations for the reception of two TRPs of the network device. Based on a current adjustment way, a scheduled PUSCH where the confliction occurs corresponds to a power boosting adjustment parameter of an open-loop power, and the terminal may not determine which TRP has the resource confliction. Therefore, the open-loop power may merely be adjusted in two different TRP transmission directions simultaneously based on the same power boosting parameter of the open-loop power, which may cause the terminal to waste a precious transmission power and directly increase the interference to other users, thereby leading to a problem that a system performance is reduced. Therefore, a power boosting mechanism of the OLPC needs to be enhanced.

Embodiments of the disclosure provide a method for controlling an open-loop power of a PUSCH. In the method for controlling an open-loop power of a PUSCH, one or more power boosting parameters corresponding to one or more TRPs are configured for the terminal, power boosting parameters used when the PUSCH is sent based on a multi-TRP cooperation are indicated, and the power boosting parameters used when the PUSCH is sent correspond to different cooperative TRPs to which the PUSCH is sent, so that an enhanced method for controlling the open-loop power of the PUSCH is implemented.

In embodiments of the disclosure, for convenience of description, indication information configured to indicate the power boosting parameters used when the PUSCH is sent based on the multi-TRP cooperation is called first indication information.

FIG. 2 is a flow chart illustrating a method for controlling an open-loop power of a PUSCH according to an exemplary embodiment. As illustrated in FIG. 2, the method for controlling an open-loop power of a PUSCH includes the following steps.

At step S11, an open-loop power control (OLPC) parameter required by a terminal is configured and determined. The OLPC parameter includes one or more power boosting parameters corresponding to one or more transmission and reception point (TRPs).

At step S12, first indication information is sent. The first indication information is configured to indicate power boosting parameters used when the PUSCH is sent based on a multi-TRP cooperation. The power boosting parameters used when the PUSCH is sent correspond to different cooperative TRPs to which the PUSCH is sent.

With the method for controlling an open-loop power of a PUSCH according to embodiments of the disclosure, the OLPC parameter required by the terminal is configured, the OLPC parameter includes the one or more power boosting parameters corresponding to the one or more TRPs, and the power boosting parameters used when the PUSCH is sent based on the multi-TRP cooperation are indicated through the first indication information, which may implement that the power boosting parameters used when the PUSCH is sent correspond to different cooperative TRPs to which the PUSCH is sent, enhancement is performed on the power boosting parameters of the multiple TRPs, and the OLPC parameter is used for the multiple TRPs to realize expansion and enhancement for the power boosting, thereby implementing enhancement on the power boosting mechanism of the OLPC.

In an implementation of the method for controlling an open-loop power of a PUSCH according to embodiments of the disclosure, a radio resource control (RRC) configuration of the power boosting parameters of the OLPC may be enhanced, to support configuring power boosting parameters respectively for the PUSCH sent to different TRPs.

FIG. 3 is a flow chart illustrating a method for controlling an open-loop power of a PUSCH according to an exemplary embodiment. The method illustrated in FIG. 3 includes the following step.

At step S21, the OLPC parameter is determined based on RRC configuration information. The RRC configuration information is used to configure power boosting parameters respectively for the PUSCH sent to different TRPs.

In the method for controlling an open-loop power of a PUSCH according to embodiments of the disclosure, the extended and enhanced RRC configuration information may be enhanced by at least one of following ways, so as to support a PUSCH power boosting control parameter configuration extended to the multiple TRPs.

Way 1: a set of PUSCH power boosting parameter configurations (p0-PUSCH-SetList-r16) is configured, and each set corresponds to an SRS resource set. In this case, the RRC configuration information includes multiple sets of PUSCH power boosting parameter configurations, and different sets of PUSCH power boosting parameter configurations in the multiple sets of PUSCH power boosting parameter configurations correspond to different SRS resource sets.

Way2: an SRI resource set identification (sri-resource-setId) is configured in each P0-PUSCH-Set-r16 to indicate a specific SRS resource set. That is, the RRC configuration information includes the SRI resource set identification, and a corresponding relationship between sets of PUSCH power boosting parameter configurations and SRS resource sets is established based on the SRI resource set identification.

Way 3: a "p0-List-r16" is configured in each P0-PUSCH-Set-r16 for indicating an extended P0. That is, the RRC configuration information includes multiple groups of power parameter configurations, and the multiple groups of power parameter configurations are included in a set of PUSCH power boosting parameter configurations.

With the method for controlling an open-loop power of a PUSCH according to embodiments of the disclosure, a power indication of the OLPC in the DCI needs to be enhanced to support indicating different power boosting parameters respectively for the PUSCH sent to different TRPs. That is, the network device may send the first indication information via the DCI in embodiments of the disclosure.

Figures 4, 5, 6, 7, 8:
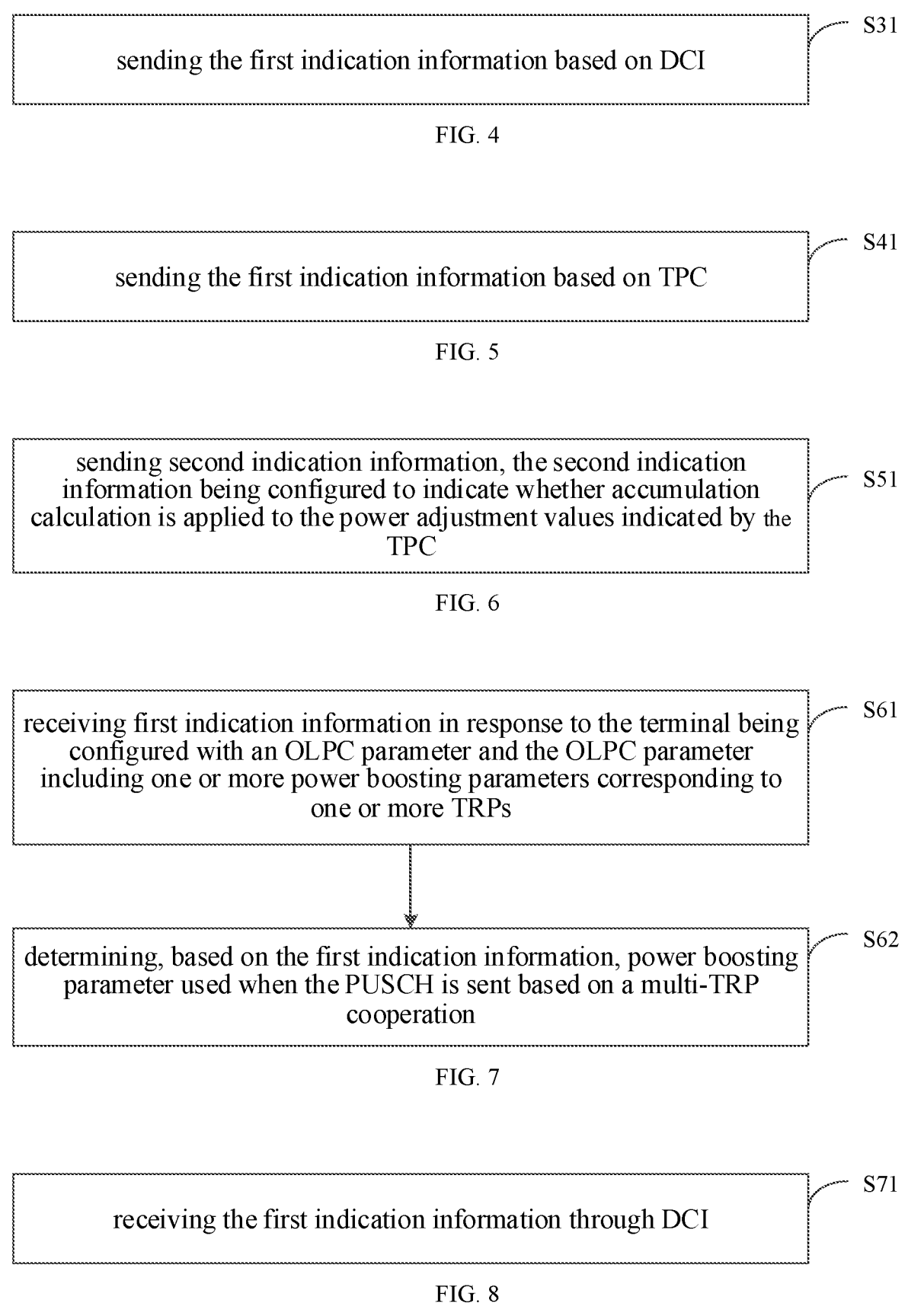

FIG. 4 is a flow chart illustrating a method for controlling an open-loop power of a PUSCH according to an exemplary embodiment. The method illustrated in FIG. 4 includes the following step.

At step S31, the first indication information is sent based on downlink control information (DCI).

In the method for controlling an open-loop power of a PUSCH according to embodiments of the disclosure, a DCI field may be extended, and the power boosting parameters for sending the PUSCH to different TRPs may be independently indicated based on the extended DCI field. In an example, in embodiments of the disclosure, the DCI fields in the DCI configured to independently indicate the power boosting parameters for sending the PUSCH to different TRPs are called a first indication field and a second indication field. The first indication field is configured to indicate a power boosting parameter for sending the PUSCH to a first TRP, and the second indication field is configured to indicate a power boosting parameter for sending the PUSCH to a second TRP.

In the method for controlling an open-loop power of a PUSCH according to embodiments of the disclosure, in response to SRI information that indicates transmissions to different TRPs existing in the DCI, a 1-bit indication field may be extended, and each indication field is configured to indicate whether the power boosting parameter is indicated. That is, for different cooperative TRPs to which the PUSCH is sent, a power boosting parameter for sending the PUSCH in a TRP transmission direction is obtained in an association manner from a set of open-loop power parameters indicated by the first indication field or the second indication field of the DCI by SRI information indicated in the TRP transmission direction.

In the method for controlling an open-loop power of a PUSCH according to embodiments of the disclosure, in response to SRI information that indicates transmissions to different TRPs not existing in the DCI, for different cooperative TRPs to which the PUSCH is sent, a power boosting parameter for sending the PUSCH in a TRP transmission direction exists in an association manner in a set of OLPC parameters indicated by the first indication field or the second indication field. That is, in the case that no SRI field exists in the DCI, a 1-bit indication field or a 2-bit indication field may be extended, and each indication field is configured to indicate whether the power boosting parameter is indicated and indicate which power boosting parameter is used.

Further, in embodiments of the disclosure, the set of open-loop power parameters indicated by the first indication field and/or the second indication field may be P0-PUSCH-AlphaSet in the mechanism of the Rel-15, or may be P0-PUSCH-SetList-r16 in the mechanism of the R-16.

In the method for controlling an open-loop power of a PUSCH according to embodiments of the disclosure, a DCI field may be extended, and the power boosting parameters for sending the PUSCH to different TRPs may be jointly indicated based on the extended DCI field.

In an example, in embodiments of the disclosure, jointly indicating the power boosting parameters for sending the PUSCH to different TRPs by the extended DCI field may include using an OLPC power code point to correspond to the one or more TRPs associated with sending the PUSCH and to associate with a PUSCH power set corresponding to the one or more TRPs.

In an example, in embodiments of the disclosure, in response to the SRI information that indicates transmissions to different TRPs existing in the DCI, a schematic corresponding relationship indicating that the OLPC power code point corresponds to the one or more TRPs associated with sending the PUSCH and is associated with the PUSCH power set corresponding to the TRP may be shown in following tables 2 and 3.

Table 2 shows that the DCI includes the SRI information indicating transmissions to different TRPs, and shows the corresponding relationship between the OLPC power code points and the TRPs associated with sending the PUSCH by 2 bits.

TABLE 2

| OLPC_codepoint | P0_TRP1 | P0_TRP2 |
|---|---|---|
| 0 | obtaining P0 from a set of OLPC parameters applied for the eMBB traffic corresponding to the TRP1 | obtaining P0 from a set of OLPC parameters applied for the eMBB traffic corresponding to the TRP2 |
| 1 | obtaining P0 from the set of OLPC parameters applied for the eMBB traffic corresponding to the TRP1 | obtaining P0'' from a set of OLPC parameters applied for the URLLC traffic corresponding to the TRP2 when confliction occurs |
| 2 | obtaining P0' from a set of OLPC parameters applied for the URLLC traffic corresponding to the TRP1 when confliction occurs | obtaining P0 from the set of OLPC parameters applied for the eMBB traffic corresponding to the TRP2 |
| 3 | obtaining P0' from the set of OLPC parameters applied for the URLLC traffic corresponding to the TRP1 when confliction occurs | obtaining P0'' from the set of OLPC parameters applied for the URLLC traffic corresponding to the TRP2 when confliction occurs |

TABLE 3

| OLPC_codepoint | P0_TRP1 | P0_TRP2 |
|---|---|---|
| 0 | obtaining P0 from the set of OLPC parameters applied for the eMBB traffic corresponding to the TRP1 | obtaining P0 from the set of OLPC parameters applied for the eMBB traffic corresponding to the TRP2 |
| 1 | obtaining P0 from the set of OLPC parameters applied for the eMBB traffic corresponding to the TRP1 | obtaining P0'' from the set of OLPC parameters applied for the URLLC traffic corresponding to the TRP2 when confliction occurs |
| 2 | obtaining P0' from the set of OLPC parameters applied for the URLLC traffic corresponding to the TRPI when confliction occurs | obtaining P0 from the set of OLPC parameters applied for the eMBB traffic corresponding to the TRP2 |
| 3 | obtaining P0' from the set of OLPC parameters applied for the URLLC traffic corresponding to the TRPI when confliction occurs | obtaining P0'' from the set of OLPC parameters applied for the URLLC traffic corresponding to the TRP2 when confliction occurs |
| 4 | obtaining P0 from the set of OLPC parameters applied for the eMBB traffic corresponding to the TRP1 | obtaining P0'' from a set of OLPC parameters applied for the eMBB and URLLC traffics of a terminal corresponding to the TRP2 when confliction with the eMBB traffic occurs |
| 5 | obtaining P0' from a set of OLPC parameters applied for the eMBB and URLLC traffics of a terminal corresponding to the TRPI when confliction with the eMBB traffic occurs | obtaining P0 from the set of OLPC parameters applied for the eMBB traffic corresponding to the TRP2 |
| 6 | obtaining P0' from the set of OLPC parameters applied for the eMBB and URLLC traffics of a terminal corresponding to the TRPI when confliction with the eMBB traffic occurs | obtaining P0'' from a set of OLPC parameters applied for the eMBB and URLLC traffics of a terminal corresponding to the TRP2 when confliction with the eMBB traffic occurs |
| 7 | reserved | reserved |

Table 3 shows that the DCI includes SRI information indicating transmissions to different TRPs, and indicates the corresponding relationship between the OLPC power code points and the TRPs associated with sending the PUSCH by 3 bits.

It may be understood that, as illustrated in Tables 2 and 3 in embodiments of the disclosure, by introducing support of two P0 values, a power control boosting is introduced when the terminal simultaneously configured with the eMBB and URLLC traffics conflicts with the terminal configured with the eMBB. Further, the corresponding relationships between the OLPC power code points and the TRPs associated with sending the PUSCH illustrated in Table 2 and Table 3 in embodiments of the disclosure are merely for schematic illustration, not for limitation, and other corresponding relationships may be possible.

In an example, in embodiments of the disclosure, in case that no SRI information indicating transmissions to different TRPs exists in the DCI, a schematic corresponding relationship indicating that the OLPC power code point corresponds to the one or more TRPs associated with sending the PUSCH and is associated with the PUSCH power set corresponding to the TRP may be shown in following Table 4.

TABLE 4

| OLPC_codepoint | P0_TRP1 | P0_TRP2 |
|---|---|---|
| 0 | obtaining P0 from the set of OLPC parameters applied for the eMBB traffic corresponding to the TRP1 | obtaining P0 from the set of OLPC parameters applied for the eMBB traffic corresponding to the TRP2 |
| 1 | obtaining a predefined P0 from the set of OLPC parameters applied for the eMBB traffic corresponding to the TRP1 | obtaining P0'' from the set of OLPC parameters applied for the URLLC traffic corresponding to the TRP2 when confliction occurs |
| 2 | obtaining a predefined P0' from the set of OLPC parameters applied for the URLLC traffic corresponding to the TRP1 when confliction occurs | obtaining a predefined P0 from the set of OLPC parameters applied for the eMBB traffic corresponding to the TRP2 |
| 3 | obtaining a predefined P0' from the set of OLPC parameters applied for the URLLC traffic corresponding to the TRP1 when confliction occurs | obtaining a predefined P0'' from the set of OLPC parameters applied for the URLLC traffic corresponding to the TRP2 when confliction occurs |
| 4 | obtaining a predefined P0 from the set of OLPC parameters applied for the eMBB traffic corresponding to the TRP1 | obtaining a predefined P0'' from the set of OLPC parameters applied for the eMBB and URLLC traffics of a terminal corresponding to the TRP2 when confliction with the eMBB traffic occurs |

TABLE 4-continued

| OLPC_codepoint | P0_TRP1 | P0_TRP2 |
|---|---|---|
| 5 | obtaining a predefined P0' from the set of OLPC parameters applied for the eMBB and URLLC traffics of a terminal corresponding to the TRP1 when confliction with the eMBB traffic occurs | obtaining a predefined P0 from the set of OLPC parameters applied for the eMBB traffic corresponding to the TRP2 |
| 6 | obtaining a predefined P0' from the set of OLPC parameters applied for the eMBB and URLLC traffics of a terminal corresponding to the TRP1 when confliction with the eMBB traffic occurs | obtaining a predefined P0'' from the set of OLPC parameters applied for the eMBB and URLLC traffics of a terminal corresponding to the TRP2 when confliction with the eMBB traffic occurs |
| 7 | reserved | reserved |

Table 4 shows that no SRI information indicating transmissions to different TRPs exists in the DCI, and indicates the corresponding relationship between the OLPC power code points and the TRPs associated with sending the PUSCH by 3 bits.

It may be understood that, the corresponding relationship between the OLPC power code points and the TRPs associated with sending the PUSCH illustrated in Table 3 in embodiments of the disclosure is only for schematic illustration, not for limitation, and other corresponding relationships may be possible.

In the method for controlling an open-loop power of a PUSCH according to embodiments of the disclosure, in another implementation, the power boosting parameters used when the PUSCH is sent based on the multi-TRP cooperation may be indicated by extending transmit power control (TPC) indication information. That is, the first indication information may be sent based on the TPC in embodiments of the disclosure.

In the method for controlling an open-loop power of a PUSCH according to embodiments of the disclosure, firstly, the RRC configuration information that needs to be extended and enhanced may be enhanced in following ways, to support the PUSCH power boosting control parameter configuration extended to multiple TRPs. The set of PUSCH power boosting parameter configurations (p0-PUSCH-SetList-r16) is configured, and each set of PUSCH power boosting parameter configurations corresponds to an SRS resource set. In this case, the RRC configuration information includes the multiple sets of PUSCH power boosting parameter configurations, and different sets of PUSCH power boosting parameter configurations in the multiple sets of PUSCH power boosting parameter configurations correspond to different SRS resource sets.

Secondly, the DCI field may be enhanced, and the power boosting parameters for sending the PUSCH to different TRPs may be independently indicated based on the extended DCI field. In an example, in embodiments of the disclosure, the DCI fields for independently indicating the power boosting parameters for sending the PUSCH to different TRPs in the DCI are called the first indication field and the second indication field. The first indication field is configured to indicate the power boosting parameter for sending the PUSCH to the first TRP, and the second indication field is configured to indicate the power boosting parameter for sending the PUSCH to the second TRP. In case that the DCI includes the SRI information indicating transmissions to different TRPs, a 1-bit indication field may be extended, and each indication field is configured to indicate whether the power boosting parameter is indicated. That is, for different cooperative TRPs to which the PUSCH is sent, the power boosting parameter for sending the PUSCH in the TRP transmission direction is obtained from the set of open-loop power parameters indicated by the first indication field or the second indication field of the DCI by the SRI information indicated in the TRP transmission direction. In case that no SRI information indicating transmissions to different TRPs exists in the DCI, for different cooperative TRPs to which the PUSCH is sent, the power boosting parameter for sending the PUSCH in the TRP transmission direction exists in an association manner in the set of power parameters indicated by the first indication field or the second indication field. That is, a 1-bit indication field or a 2-bit indication field may be extended in the case that no SRI field exists in the DCI, and each indication field is configured to indicate whether the power boosting parameter is indicated and to indicate which power boosting parameter is used.

In the method for controlling an open-loop power of a PUSCH according to another embodiment of the disclosure, the RRC configuration information that needs to be enhanced and expanded may be enhanced in following ways to support the PUSCH power boosting control parameter configuration extended to multiple TRPs. The set of PUSCH power boosting parameter configurations (p0-PUSCH-SetList-r16) is configured, each set of PUSCH power boosting parameter configurations corresponds to an SRS resource set. In this case, the RRC configuration information includes multiple sets of PUSCH power boosting parameter configurations, and different sets of PUSCH power boosting parameter configurations in the multiple sets of PUSCH power boosting parameter configurations correspond to different SRS resource sets.

Secondly, the DCI field may be enhanced, and the power boosting parameters for sending the PUSCH to different TRPs may be jointly indicated based on the extended DCI field. In an example, in embodiments of the disclosure, indicating the power boosting parameters for sending the PUSCH to different TRPs jointly by the extended DCI field may include using the OLPC power code point to correspond to the one or more TRPs associated with sending the PUSCH and to associate with the PUSCH power set corresponding to the TRP. In an example, in an embodiment of the disclosure, in case that the DCI includes the SRI information indicating transmissions to different TRPs, a schematic corresponding relationship indicating that the OLPC power code point corresponds to the one or more TRPs associated with sending the PUSCH and is associated with the PUSCH power set corresponding to the TRP may be shown in Table 2 and Table 3.

In the method for controlling an open-loop power of a PUSCH according to embodiments of the disclosure, firstly the RRC configuration information that needs to be enhanced and extended may be enhanced in following ways, to support the PUSCH power boosting control parameter configuration extended to multiple TRPs. The SRI resource set indication (sri-resource-setId) is configured in each P0-PUSCH-Set-r16 to indicate a specific SRS resource set. That is, the RRC configuration information includes the SRI resource set indication, and the corresponding relationship between the sets of PUSCH power boosting parameter configurations and the SRS resource sets is established through the SRI resource set indication.

Secondly, the DCI field may be enhanced, and the power boosting parameters for sending the PUSCH to different TRPs may be independently indicated based on the extended DCI field. In an example, in embodiments of the disclosure, the DCI fields configured to independently indicate the power boosting parameters for sending the PUSCH to different TRPs in the DCI are called the first indication field and the second indication field. The first indication field is configured to indicate the power boosting parameter for sending the PUSCH to the first TRP, and the second indication field is configured to indicate the power boosting parameter for sending the PUSCH to the second TRP. In case that the DCI includes the SRI information indicating transmissions to different TRPs, a 1-bit indication field may be extended, and each indication field is configured to indicate whether the power boosting parameter is indicated. That is, for different cooperative TRPs to which the PUSCH is sent, the power boosting parameter for sending the PUSCH in the TRP transmission direction is obtained in an association manner from the set of open-loop power parameters indicated by the first indication field or the second indication field of the DCI based on the SRI information indicated in the TRP transmission direction. In case that no SRI information indicating transmissions to different TRPs exists in the DCI, for different cooperative TRPs to which the PUSCH is sent, the power boosting parameter for sending the PUSCH in the TRP transmission direction exists in an association manner in the set of power parameters indicated by the first indication field or the second indication field. That is, in the case that no SRI field exists in the DCI, a 1-bit indication field or a 2-bit indication field may be extended, and each indication field is configured to indicate whether the power boosting parameter is indicated and to indicate which power boosting parameter is used.

In the method for controlling an open-loop power of a PUSCH according to another embodiment of the disclosure, firstly the RRC configuration information that needs to be extended and enhanced may be enhanced in following ways, to support the PUSCH power boosting control parameter configuration extended to multiple TRPs. The SRI resource set indication (sri-resource-setId) is configured in each P0-PUSCH-Set-r16 to indicate a specific SRS resource set. That is, the RRC configuration information includes the SRI resource set indication, and the corresponding relationship between sets of PUSCH power boosting parameter configurations and SRS resource sets is established by the SRI resource set indication.

Secondly, the DCI field may be extended, and the power boosting parameters for sending the PUSCH to different TRPs may be jointly indicated based on the extended DCI field. In an example, in embodiments of the disclosure, jointly indicating the power boosting parameters for sending the PUSCH to different TRPs by the extended DCI field may include using the OLPC power code point to correspond to the one or more TRPs associated with sending the PUSCH and to associate with the PUSCH power set corresponding to the TRP. In an example, in case that the DCI includes the SRI information indicating transmissions to different TRPs, the schematic corresponding relationship indicating that the OLPC power code point corresponds to the one or more TRPs associated with sending the PUSCH and is associated with the PUSCH power set corresponding to the TRP may be shown in Table 2 and Table 3.

In the method for controlling an open-loop power of a PUSCH according to embodiments of the disclosure, firstly the RRC configuration information that needs to be extended and enhanced may be enhanced in following ways, to support the PUSCH power boosting control parameter configuration extended to multiple TRPs. The "p0-List-r16" is configured in each P0-PUSCH-Set-r16 for indicating the extended P0. That is, the RRC configuration information includes the multiple groups of power parameter configurations, and the multiple groups of power parameter configurations are included in the set of PUSCH power boosting parameter configurations.

Secondly, the DCI field may be enhanced, and the power boosting parameters for sending the PUSCH to different TRPs may be independently indicated based on the extended DCI field. In an example, in embodiments of the disclosure, the DCI fields configured to independently indicate the power boosting parameters for sending the PUSCH to different TRPs in the DCI are called the first indication field and the second indication field. The first indication field is configured to indicate the power boosting parameter for sending the PUSCH to the first TRP, and the second indication field is configured to indicate the power boosting parameter for sending the PUSCH to the second TRP. In case that the DCI includes the SRI information indicating transmissions to different TRPs, a 1-bit indication field may be extended, and each indication field is configured to indicate whether the power boosting parameter is indicated. That is, for different cooperative TRPs to which the PUSCH is sent, the power boosting parameter for sending the PUSCH in the TRP transmission direction is obtained in an association manner from the set of open-loop power parameters indicated by the first indication field or the second indication field of the DCI by the SRI information indicated in the TRP transmission direction. In case that no SRI information indicating transmissions to different TRPs exists in the DCI, for different cooperative TRPs to which the PUSCH is sent, the power boosting parameter for sending the PUSCH in the TRP transmission direction exists in an association manner in a set of power parameters indicated by the first indication field or the second indication field. That is, in the case that there is no SRI field in DCI, a 1-bit indication field or a 2-bit indication field may be extended, and each indication field is configured to indicate whether the power boosting parameter is indicated and which power boosting parameter is used.

In the method for controlling an open-loop power of a PUSCH according to another embodiment of the disclosure, firstly the RRC configuration information that needs to be extended and enhanced may be enhanced in following ways, to support the PUSCH power boosting control parameter configuration extended to multiple TRPs. The "p0-List-r16" is configured in each P0-PUSCH-Set-r16 for indicating the extended P0. That is, the RRC configuration information includes multiple groups of power parameter configurations, and the multiple groups of power parameter configurations are included in the set of PUSCH power boosting parameter configurations.

Secondly, the DCI field may be enhanced, and the power boosting parameters for sending the PUSCH to different TRPs may be jointly indicated based on the extended DCI field. In an example, in embodiments of the disclosure, jointly indicating the power boosting parameters for sending the PUSCH to different TRPs based on the extended DCI field may include using the OLPC power code point to correspond to the one or more TRPs associated with sending the PUSCH and to associate with the PUSCH power set corresponding to the TRP. In an example, in embodiments of the disclosure, in case that the DCI includes the SRI information indicating transmissions to different TRPs, the schematic corresponding relationship indicating that the OLPC power code point corresponds to the one or more TRPs associated with sending the PUSCH and is associated with the PUSCH power set corresponding to the TRP may be shown in Table 2 and Table 3.

FIG. 5 is a flow chart illustrating a method for controlling an open-loop power of a PUSCH according to an exemplary embodiment. As illustrated in FIG. 5, the method includes the following step.

second indication information may be a TPC command for indicating that the accumulation calculation is applied. The terminal determines the adjustment parameter based on the TPC command for indicating that the accumulation calculation is applied. The second indication information may also be a TPC command for indicating that accumulation calculation is not applied. The terminal determines the adjustment parameter based on the TPC command for indicating that the accumulation calculation is not applied. The TPC command for indicating whether the accumulation calculation is applied is indicated by a higher-layer signaling.

In embodiments of the disclosure, TPC parameters controlled by different TRPs may employ a TPC command field indicated independently or a TPC command field indicated jointly. The TPC command field indicated independently is illustrated in Table 5 below, and an indication meaning of each TPC corresponds to the same table interpretation.

TABLE 5

| TPC command field | Power adjustment_accumulated_TRP1, a power adjustment value (dB) corresponding to the TPC command for indicating that the accumulation calculation is applied | Power adjustment_accumulated_TRP2, a power adjustment value (dB) corresponding to the TPC command for indicating that the accumulation calculation is not applied |
|---|---|---|
| 0 | −3 | −6 |
| 1 | 0 | −3 |
| 2 | 3 | 0 |
| 3 | 6 | 6 |

At step S41, the first indication information is sent based on transmit power control (TPC).

In the method of controlling an open-loop power of a PUSCH according to embodiments of the disclosure, the TPC may be configured to indicate one or more power adjustment values corresponding respectively to the one or more TRPs.

Further, in embodiments of the disclosure, the network device may also send a TPC command indicating whether accumulation calculation is applied.

In embodiments of the disclosure, for convenience of description, indication information for indicating whether accumulation calculation is applied to the power adjustment values indicated by the TPC may be called second indication information.

FIG. 6 is a flow chart illustrating a method for controlling an open-loop power of a PUSCH according to an exemplary embodiment. As illustrated in FIG. 6, the method includes the following step.

At step S51, the second indication information is sent. The second indication information is configured to indicate whether accumulation calculation is applied to the power adjustment values indicated by the TPC.

In the method for controlling an open-loop power of a PUSCH according to embodiments of the disclosure, the power adjustment value corresponding to each of the one or more TRPs is indicated by a TPC field extended based on the multi-TRP. Further, extending an indication range of a power adjustment in each TPC field may include determining, based on a control parameter indicated by the second indication information, an adjustment parameter obtained with or without the accumulation calculation being applied to the power adjustment value indicated by the TPC. The With the method for controlling an open-loop power of a PUSCH according to embodiments of the disclosure, the power boosting control on the OLPC for different TRPs is implemented by a design enhancement of the higher-layer signaling and the DCI command for the PUSCH, thus avoiding an interference control when the URLLC traffic conflicts with the eMBB traffic and ensuring the high reliability of the URLLC traffic.

Based on the same concept, embodiments of the disclosure also provide a method for controlling an open-loop power of a PUSCH. The method may be executed by a terminal.

FIG. 7 is a flow chart illustrating a method for controlling an open-loop power of a PUSCH according to an exemplary embodiment. As illustrated in FIG. 7, the method includes the following steps.

At step S61, first indication information is received in response to the terminal being configured with an OLPC parameter and the OLPC parameter including one or more power boosting parameters corresponding to one or more TRPs.

The first indication information is configured to indicate power boosting parameters used when the PUSCH is sent based on a multi-TRP cooperation, and the power boosting parameters used when the PUSCH is sent correspond to different cooperative TRPs to which the PUSCH is sent.

At step S62, the power boosting parameters used when the PUSCH is sent based on the multi-TRP cooperation are determined based on the first indication information.

In the method for controlling an open-loop power of a PUSCH according to embodiments of the disclosure, the OLPC parameter may be determined based on RRC configuration information. The RRC configuration information is used to configure power boosting parameters respectively for the PUSCH sent to different TRPs.

In an implementation, the RRC configuration information includes at least one of messages and is configured to support a PUSCH power boosting control parameter configuration extended to multiple TRPs. The messages include the following: multiple sets of PUSCH power boosting parameter configurations, in which, different sets of PUSCH power boosting parameter configurations in the multiple sets of PUSCH power boosting parameter configurations corresponds to different SRS resource sets; an SRS resource indication (SRI) resource set identification, in which, a corresponding relationship between sets of PUSCH power boosting parameter configurations and SRS resource sets is established based on the SRI resource set identification; and multiple groups of power parameter configurations, in which, the multiple groups of power parameter configurations are included in a set of PUSCH power boosting parameter configurations.

FIG. 8 is a flow chart illustrating a method for controlling an open-loop power of a PUSCH according to an exemplary embodiment. As illustrated in FIG. 8, the method includes the following step.

At step S71, the first indication information is received through downlink control information (DCI).

In an implementation, the DCI includes a first indication field and a second indication field. The first indication field is configured to indicate a power boosting parameter for sending the PUSCH to a first TRP, and the second indication field is configured to indicate a power boosting parameter for sending the PUSCH to a second TRP.

In an implementation, in response to SRI information indicating transmissions to different TRPs existing in the DCI, for the different cooperative TRPs to which the PUSCH is sent, a power boosting parameter for sending the PUSCH in a TRP transmission direction is obtained in an association manner from a set of open-loop power parameters indicated by the first indication field or the second indication field through SRI information indicated in the TRP transmission direction.

In an implementation, in response to indication that no SRI information indicating transmissions to different TRPs existing in the DCI, for the different cooperative TRPs to which the PUSCH is sent, a power boosting parameter for sending the PUSCH in a TRP transmission direction exists in an association manner in a set of power parameters indicated by the first indication field or the second indication field.

In an implementation, the DCI includes an OLPC power code point. The OLPC power code point corresponds to one or more TRPs associated with sending the PUSCH and is associated with a PUSCH power set corresponding to the one or more TRPs.

FIG. 9 is a flow chart illustrating a method for controlling an open-loop power of a PUSCH according to an exemplary embodiment. As illustrated in FIG. 9, the method includes the following step.

At step S81, the first indication information is received based on TPC.

In an implementation, the TPC is configured to indicate one or more power adjustment values corresponding respectively to the one or more TRPs.

FIG. 10 is a flow chart illustrating a method for controlling an open-loop power of a PUSCH according to an exemplary embodiment. As illustrated in FIG. 10, the method includes the following step.

At step S91, second indication information is received. The second indication information is configured to indicate whether accumulation calculation is applied to the one or more power adjustment values indicated by the TPC.

It may be understood that the method for controlling an open-loop power of a PUSCH executed by the terminal in embodiments of the disclosure is similar to the method for controlling an open-loop power of a PUSCH executed by the network device. Therefore, regarding the contents of the method for controlling an open-loop power of a PUSCH executed by the terminal in embodiments of the disclosure not described in detail enough, reference may be made to the method for controlling an open-loop power of a PUSCH executed by the network device in the above embodiments.

It may be further understood that, the method for controlling an open-loop power of a PUSCH according to embodiments of the disclosure may also be applied to an implementation process of implementing the open-loop power control of the PUSCH by interaction between the terminal and the network device. For the implementation process of implementing the open-loop power control of the PUSCH by the interaction between the network device and the terminal, the network device and the terminal respectively have related functions for implementing the above embodiments, which is not elaborated herein.

It should be noted that, the skilled in the art may understand that the above various implementations/embodiments related to embodiments of the disclosure may be used in combination with the above-mentioned embodiments or used alone. Whether used alone or in combination with the aforementioned embodiments, the implementation principles are similar. In the implementation of the disclosure, some embodiments are described as embodiments used in combination with each other. Of course, the skilled in the art may understand that such illustration is not a limitation of embodiments of the disclosure.

Based on the same concept, embodiments of the disclosure also provide an apparatus for controlling an open-loop power of a PUSCH.

It may be understood that, the apparatus for controlling the open-loop power of the PUSCH provided by embodiments of the disclosure includes corresponding hardware structures and/or software modules for performing various functions in order to implement the above-mentioned functions. In combination with units and algorithm steps of each example disclosed in embodiments of the disclosure, embodiments of the disclosure may be implemented in a form of hardware or a combination of hardware and computer software. Whether the functions are performed by hardware or by hardware driven by computer software depends on particular applications and design constraint conditions of the technical solution. The skilled in the art may use different methods to implement the described functions for each particular application, but it should not be considered that the implementation goes beyond the scope of the present invention.

FIG. 11 is a block diagram illustrating an apparatus for controlling an open-loop power of a PUSCH according to an exemplary embodiment. Referring to FIG. 11, the apparatus 100 for controlling an open-loop power of a PUSCH includes a processing unit 101 and a sending unit 102.

The processing unit 101 is configured to configure and determine an open-loop power control (OLPC) parameter required by a terminal, in which, the OLPC parameter includes one or more power boosting parameters corresponding to one or more TRPs. The sending unit 102 is configured to send first indication information, in which, the first indication information is configured to indicate power boosting parameters used when the PUSCH is sent based on a multi-TRP cooperation. The power boosting parameters used when the PUSCH is sent correspond to different cooperative TRPs to which the PUSCH is sent.

In an implementation, the processing unit 101 is configured to: determine the OLPC parameter based on radio resource control (RRC) configuration information. The RRC configuration information is used to configure the power boosting parameters respectively for the PUSCH sent to different TRPs.

In an implementation, the RRC configuration information includes at least one of messages and is configured to support a PUSCH power boosting control parameter configuration extended to multiple TRPs.

The messages includes the following: a plurality of sets of PUSCH power boosting parameter configurations, in which, different sets of PUSCH power boosting parameter configurations in the plurality of sets of PUSCH power boosting parameter configurations correspond to different SRS resource sets; an SRI resource set identification, in which, a corresponding relationship between sets of PUSCH power boosting parameter configurations and SRS resource sets is established based on the SRI resource set identification; and a plurality of groups of power parameter configurations, in which, the plurality of groups of power parameter configurations are included in a set of PUSCH power boosting parameter configurations.

In an implementation, the sending unit 102 is configured to send the first indication information through downlink control information (DCI).

In an implementation, the DCI includes a first indication field and a second indication field.

The first indication field is configured to indicate a power boosting parameter for sending the PUSCH to a first TRP, and the second indication field is configured to indicate a power boosting parameter for sending the PUSCH to a second TRP.

In an implementation, in response to SRI information indicating transmissions to different TRPs existing in the DCI, for the different cooperative TRPs to which the PUSCH is sent, a power boosting parameter for sending the PUSCH in a TRP transmission direction is obtained in an association manner from a set of open-loop power parameters indicated by the first indication field or the second indication field through SRI information indicated in the TRP transmission direction.

In an implementation, in response to SRI information indicating transmissions to different TRPs not existing in the DCI, for the different cooperative TRPs to which the PUSCH is sent, a power boosting parameter for sending the PUSCH in a TRP transmission direction exists in an association manner in a set of power parameters indicated by the first indication field or the second indication field.

In an implementation, the DCI includes an OLPC power code point, and the OLPC power code point corresponds to one or more TRPs associated with sending the PUSCH and is associated with a PUSCH power set corresponding to the one or more TRPs.

In an implementation, the sending unit 102 is configured to send the first indication information based on power control indication information.

In an implementation the power control indication information is configured to indicate one or more power adjustment values corresponding respectively to the one or more TRPs.

In an implementation, the sending unit 102 is also configured to send second indication information. The second indication information is configured to indicate whether accumulation calculation is applied to the one or more power adjustment values indicated by the power control indication information.

FIG. 12 is a block diagram illustrating an apparatus for controlling an open-loop power of a PUSCH according to an exemplary embodiment. Referring to FIG. 12, the apparatus 200 includes a receiving unit 201 and a processing unit 202.

The receiving unit 201 is configured to receive first indication information in response to a terminal being configured with an OLPC parameter and the OLPC parameter including one or more power boosting parameters corresponding to one or more TRPs, in which, the first indication information is configured to indicate power boosting parameters used when the PUSCH is sent based on a multi-TRP cooperation, and the power boosting parameters used when the PUSCH is sent correspond to different cooperative TRPs to which the PUSCH is sent. The processing unit is configured to determine, based on the first indication information, the power boosting parameters used when the PUSCH is sent based on the multi-TRP cooperation.

In an implementation, the OLPC parameter is determined based on RRC configuration information. The RRC configuration information is used to configure power boosting parameters respectively for the PUSCH sent to different TRPs.

In an implementation, the RRC configuration information includes at least one of messages and is configured to support a PUSCH power boosting control parameter configuration extended to multiple TRPs. The messages include the following: a plurality of sets of PUSCH power boosting parameter configurations, in which, different sets of PUSCH power boosting parameter configurations in the plurality of sets of PUSCH power boosting parameter configurations correspond to different SRS resource sets; an SRI resource set identification, in which, a corresponding relationship between sets of PUSCH power boosting parameter configurations and SRS resource sets is established based on the SRI resource set identification; and a plurality of groups of power parameter configurations, in which, the plurality of groups of power parameter configurations are included in a set of PUSCH power boosting parameter configurations.

In an implementation, the receiving unit 201 is configured to receive the first indication information through downlink control information (DCI).

In an implementation, the DCI includes a first indication field and a second indication field.

The first indication field is configured to indicate a power boosting parameter for sending the PUSCH to a first TRP, and the second indication field is configured to indicate a power boosting parameter for sending the PUSCH to a second TRP.

In an implementation, in response to SRI information indicating transmissions to different TRPs existing in the DCI, for the different cooperative TRPs to which the PUSCH is sent, a power boosting parameter for sending the PUSCH in a TRP transmission direction is obtained in an association manner from a set of open-loop power parameters indicated by the first indication field or the second indication field through SRI information indicated in the TRP transmission direction.

In an implementation, in response to SRI information indicating transmissions to different TRPs not existing in the DCI, for the different cooperative TRPs to which the PUSCH is sent, a power boosting parameter for sending the PUSCH in a TRP transmission direction exists in an association manner in a set of power parameters indicated by the first indication field or the second indication field.

In an implementation, the DCI includes an OLPC power code point, and the OLPC power code point corresponds to one or more TRPs associated with sending the PUSCH and is associated with a PUSCH power set corresponding to the one or more TRPs.

In an implementation, the receiving unit 201 is configured to receive the first indication information based on power control indication information.

In an implementation, the power control indication information is configured to indicate one or more power adjustment values corresponding respectively to the one or more TRPs.

In an implementation, the receiving unit 201 is also configured to receive second indication information. The second indication information is configured to indicate whether accumulation calculation is applied to the one or more power adjustment values indicated by the power control indication information.

With respect to the apparatus in the above embodiments, the specific manners for performing operations for individual modules therein have been described in detail in the embodiments regarding the methods, which will not be elaborated herein.

FIG. 13 is a block diagram illustrating an apparatus for controlling an open-loop power of a PUSCH according to an exemplary embodiment. For example, the apparatus 300 may be a mobile phone, a computer, a digital broadcast user device, a messaging sending and receiving equipment, a game console, a tablet, a medical device, a fitness device, a personal digital assistant, or the like.

As illustrated in FIG. 13, the apparatus 300 may include one or more of: a processing component 302, a memory 304, a power component 306, a multimedia component 308, an audio component 310, an input/output (I/O) interface 312, a sensor component 314, and a communication component 316.

The processing component 302 typically controls overall operations of the apparatus 300, such as the operations associated with display, telephone calls, data communications, camera operations, and recording operations. The processing component 302 may include one or more processors 302 to execute instructions to perform all or part of the steps in the above described methods. Moreover, the processing component 302 may include one or more modules which facilitate the interaction between the processing component 302 and other components. For example, the processing component 302 may include a multimedia module to facilitate the interaction between the multimedia component 308 and the processing component 302.

The memory 304 is configured to store various types of data to support the operation of the apparatus 300. Examples of such data include instructions for any applications or methods operated on the apparatus 300 for performing contraction data, phonebook data, messages, pictures, video, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 is configured to provide power to various components of the apparatus 300. The power component 306 may include a power management system, one or more power sources, and any other components associated with the generation, management, and distribution of power in the apparatus 300.

The multimedia component 308 includes a screen providing an output interface between the apparatus 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. The front camera and the rear camera may receive an external multimedia datum while the apparatus 300 is in an operation mode, such as an adjustment mode or a video mode. Each of the front camera and the rear camera may be a fixed optical lens system or have focus and optical zoom capability.

The audio component 310 is configured to output and/or input audio signals. For example, the audio component 310 includes a microphone ("MIC") for receiving an external audio signal when the apparatus 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 is configured to provide an interface between the processing component 302 and peripheral interface modules, such as a keyboard, a click wheel, buttons, and the like. The buttons may include, but be not limited to, a home button, a volume button, a starting button, and a locking button.

The sensor component 314 includes one or more sensors for providing status assessments of various aspects of the apparatus 300. For example, the sensor component 314 may detect an open/closed status of the apparatus 300, relative positioning of components, e.g., the display and the keypad of the apparatus 300, a change in position of the apparatus 300 or a component of the apparatus 300, a presence or absence of user contraction with the apparatus 300, an orientation or an acceleration/deceleration of the apparatus 300, and a change in temperature of the apparatus 300. The sensor component 314 may include a proximity sensor for detecting the presence of nearby objects without any physical contact. The sensor component 314 may also include a light sensor, such as a CMOS (complementary metal-oxide-semiconductor)) or a CCD (charge coupled device) image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the apparatus 300 and other devices. The apparatus 300 may access a wireless network based on a communication standard, such as Wi-Fi, 2G, or 3G, or a combination thereof. In one exemplary embodiment, the communication component 316 receives a broadcast signal or broadcast associated information from an external broadcast management system via a broadcast channel. In an exemplary embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiments, the apparatus 300 may be implemented with one or more application specific integrated circuits (ASICs), digital signal processors (DSPs), digital signal processing devices (DSPDs), programmable logic devices (PLDs), field programmable gate arrays (FP-GAs), controllers, micro-controllers, microprocessors, or other electronic components, for performing the above methods.

In an exemplary embodiment, there is also provided a non-transitory computer readable storage medium including instructions, such as the memory 304 including the instructions. The instructions may be executed by the processor 320 in the apparatus 300 for performing the above methods. For example, the non-transitory computer readable storage medium may be a ROM, a RAM, a CD-ROM, a magnetic tape, a floppy disc, an optical data storage device, and the like.

Figure 14:
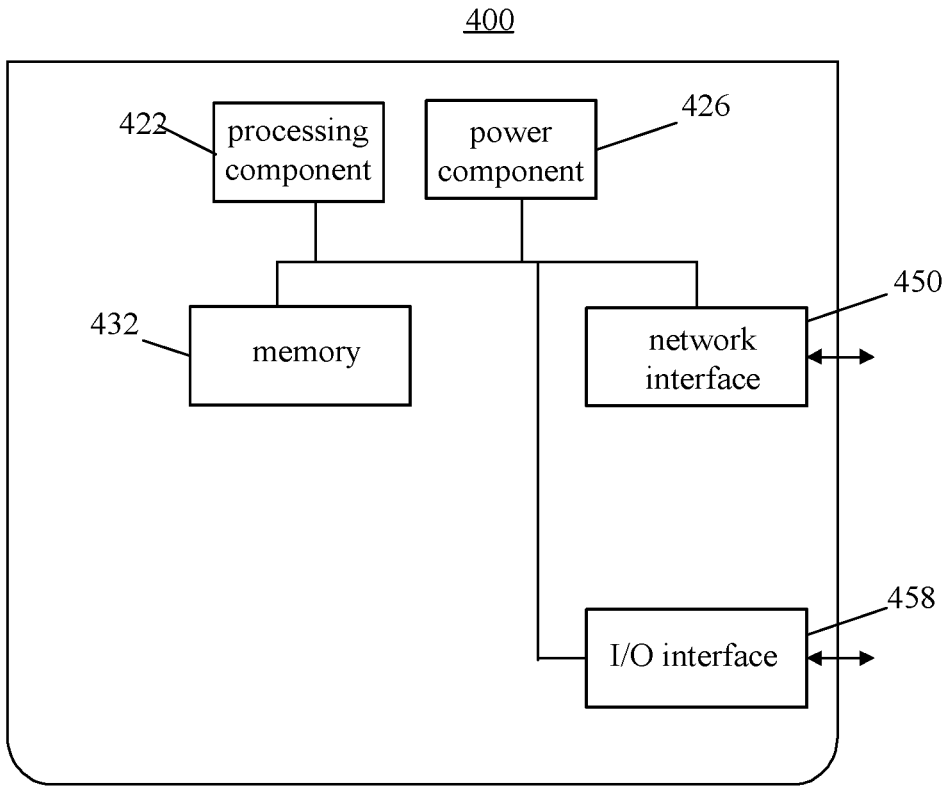
FIG. 14 is a block diagram illustrating an apparatus for controlling an open-loop power of a PUSCH according to an exemplary embodiment.

FIG. 14 is a block diagram illustrating an apparatus for controlling an open-loop power of a PUSCH according to an exemplary embodiment. For example, the apparatus 400 may be provided as a network-side device. Referring to FIG. 14, the apparatus 400 includes a processing component 422, further including one or more processors, and memory resources represented by a memory 432 for storing instructions, such as application programs, executable by the processing component 422. The application program stored in the memory 432 may include one or more modules each corresponding to a set of instructions. In addition, the processing component 422 is configured to execute instructions to execute the above method.

The apparatus 400 may also include a power component 426 configured to perform power management of the apparatus 400, a wired or wireless network interface 450 configured to connect the apparatus 400 to a network, and an input/output (I/O) interface 458. The apparatus 400 may operate an operating system stored in the memory 432, such as a windows Server™, a Mac OS X™, a Unix™, a Linux™, a FreeBSD™ or the like.\

In an exemplary embodiment, there is also provided a non-transitory computer readable storage medium including instructions, such as included in the memory 432, executable by the processor 422 in the apparatus 400, for completing the above-mentioned method. For example, the non-transitory computer-readable storage medium may be a ROM, a random access memory (RAM), a CD-ROM, a magnetic tape, a floppy disc, an optical data storage device, and the like.

It is further understood that "a plurality" in the disclosure refers to two or more, and other quantifiers are similar thereto. "And/or", which describes an associated relationship of associated objects, means that there may be three relationships, for example, A and/or B, which may mean that A exists alone, A and B exist at the same time, and B exists alone. A character "/" generally indicates that contextual objects are in an "or" relationship. "A/an" and "the" in singular forms are intended to include plural forms, unless clearly indicated in the context otherwise.

It is further understood that terms such as "first", "second", and the like are used to describe various information, these information should not be limited by these terms. These terms are only used for distinguishing information of the same type from each other and do not denote a particular order or degree of importance. As a matter of fact, the terms such as "first", "second", and the like may be used interchangeably. For example, first information may also be referred to as second information, and similarly, the second information may also be referred to as the first information, without departing from the scope of embodiments of the present disclosure.

It is further understood that although operations are described in a specific order in the accompanying drawings in embodiments of the disclosure, it should not be understood that these operations are required to be performed in the specific order shown or in a serial order, or that all of the operations shown are required to be performed to obtain desired results. In certain circumstances, multitasking and parallel processing may be advantageous.

Other embodiments of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for controlling an open-loop power of a physical uplink shared channel (PUSCH), performed by a network device, comprising:

configuring and determining an open-loop power control (OLPC) parameter required by a terminal, wherein the OLPC parameter comprises one or more power boosting parameters corresponding to one or more transmission and reception points (TRPs); and sending first indication information, wherein the first indication information is configured to indicate power boosting parameters used when the PUSCH is sent based on a multi-TRP cooperation, and the power boosting parameters correspond to different cooperative TRPs to which the PUSCH is sent;

wherein sending the first indication information comprises:

sending the first indication information through downlink control information (DCI);

wherein, when sounding reference signal resource indication (SRI) information indicating transmissions to different TRPs does not exist in the DCI, for the different cooperative TRPs to which the PUSCH is sent, a power boosting parameter for sending the PUSCH in a TRP transmission direction exists in an association manner in a set of open-loop power parameters indicated by a first indication field or a second indication field.

2. The method of claim 1, wherein determining the OLPC parameter comprises:

determining the OLPC parameter based on radio resource control (RRC) configuration information, wherein the RRC configuration information is used to configure power boosting parameters respectively for the PUSCH sent to different TRPs.

3. The method of claim 2, wherein the RRC configuration information comprises at least one message and is configured to support a PUSCH power boosting control parameter configuration extended to multiple TRPs, and the at least one message comprises one or more of:

a plurality of sets of PUSCH power boosting parameter configurations, wherein different sets of PUSCH power boosting parameter configurations in the plurality of sets of PUSCH power boosting parameter configurations correspond to different sounding reference signal (SRS) resource sets;

an SRS resource indication (SRI) resource set identification, wherein a corresponding relationship between sets of PUSCH power boosting parameter configurations and SRS resource sets is established based on the SRI resource set identification; and a plurality of groups of power parameter configurations, wherein the plurality of groups of power parameter configurations are comprised in a set of PUSCH power boosting parameter configurations.

4. The method of claim 1, wherein the DCI comprises an OLPC power code point, and the OLPC power code point corresponds to one or more TRPs associated with sending the PUSCH and is associated with a PUSCH power set corresponding to the one or more TRPs.

5. The method of claim 1, wherein sending the first indication information comprises:

sending the first indication information based on extended transmit power control (TPC) indication information.

6. The method of claim 5, wherein the extended TPC indication information is configured to indicate one or more power adjustment values corresponding respectively to the one or more TRPs.

7. The method of claim 6, further comprising:

sending second indication information, wherein the second indication information is configured to indicate whether accumulation calculation is applied to the one or more power adjustment values indicated by the extended TPC indication information.

8. A method for controlling an open-loop power of a physical uplink shared channel (PUSCH), performed by a terminal, comprising:

receiving first indication information, wherein the terminal is configured with an open-loop power control (OLPC) parameter and the OLPC parameter comprises one or more power boosting parameters corresponding to one or more transmission and reception points (TRPs), wherein the first indication information is configured to indicate power boosting parameters used when the PUSCH is sent based on a multi-TRP cooperation, and the power boosting parameters used when the PUSCH is sent correspond to different cooperative TRPs to which the PUSCH is sent; and determining, based on the first indication information, the power boosting parameters used when the PUSCH is sent based on the multi-TRP cooperation;

wherein receiving the first indication information comprises:

receiving the first indication information through downlink control information (DCI);

when sounding reference signal resource indication (SRI) information indicating transmissions to different TRPs does not exist in the DCI, for the different cooperative TRPs to which the PUSCH is sent, a power boosting parameter for sending the PUSCH in a TRP transmission direction exists in an association manner in a set of open-loop power parameters indicated by a first indication field or a second indication field.

9. The method of claim 8, wherein the OLPC parameter is determined based on radio resource control (RRC) configuration information; and the RRC configuration information is used to configure power boosting parameters respectively for the PUSCH sent to different TRPs.

10. The method of claim 9, wherein the RRC configuration information comprises at least one message and is configured to support a PUSCH power boosting control parameter configuration extended to multiple TRPs, and the at least one message comprises:

a plurality of sets of PUSCH power boosting parameter configurations, wherein different sets of PUSCH power boosting parameter configurations in the plurality of sets of PUSCH power boosting parameter configurations correspond to different sounding reference signal (SRS) resource sets;

an SRS resource indication (SRI) resource set identification, wherein a corresponding relationship between sets of PUSCH power boosting parameter configurations and SRS resource sets is established based on the SRI resource set identification; and a plurality of groups of power parameter configurations, wherein the plurality of groups of power parameter configurations are comprised in a set of PUSCH power boosting parameter configurations.

11. The method of claim 8, wherein the DCI comprises an OLPC power code point, and the OLPC power code point corresponds to one or more TRPs associated with sending the PUSCH and is associated with a PUSCH power set corresponding to the one or more TRPs.

12. The method of claim 8, wherein receiving the first indication information comprises:

receiving the first indication information based on extended transmit power control (TPC) indication information.

13. The method of claim 12, wherein the extended TPC indication information is configured to indicate one or more power adjustment values corresponding respectively to the one or more TRPs.

14. The method of claim 13, further comprising:

receiving second indication information, wherein the second indication information is configured to indicate whether accumulation calculation is applied to the one or more power adjustment values indicated by the extended TPC indication information.

15. A network device, comprising:

a processor; and a memory for storing instructions executable by the processor, wherein the processor is configured to: execute a method for controlling an open-loop power of a PUSCH comprising:

configuring and determining an open-loop power control (OLPC) parameter required by a terminal, wherein the OLPC parameter comprises one or more power boosting parameters corresponding to one or more transmission and reception points (TRPs); and sending first indication information, wherein the first indication information is configured to indicate power boosting parameters used when the PUSCH is sent based on a multi-TRP cooperation, and the power boosting parameters used when the PUSCH is sent correspond to different cooperative TRPs to which the PUSCH is sent;

wherein sending the first indication information comprises:

sending the first indication information through downlink control information (DCI);

wherein, when sounding reference signal resource indication (SRI) information indicating transmissions to different TRPs does not exist in the DCI, for the different cooperative TRPs to which the PUSCH is sent, a power boosting parameter for sending the PUSCH in a TRP transmission direction exists in an association manner in a set of open-loop power parameters indicated by a first indication field or a second indication field.

16. A terminal, comprising:

a processor; and a memory for storing instructions executable by the processor, wherein the processor is configured to: execute the method for controlling an open-loop power of a PUSCH according to claim 8.

\* \* \* \* \*